B. G. BRAINE & V. C. ARMSTRONG.
INSULATED RAIL JOINT.
APPLICATION FILED APR. 16, 1908.
1,066,074.
Patented July 1, 1913.
4 SHEETS—SHEET 2.
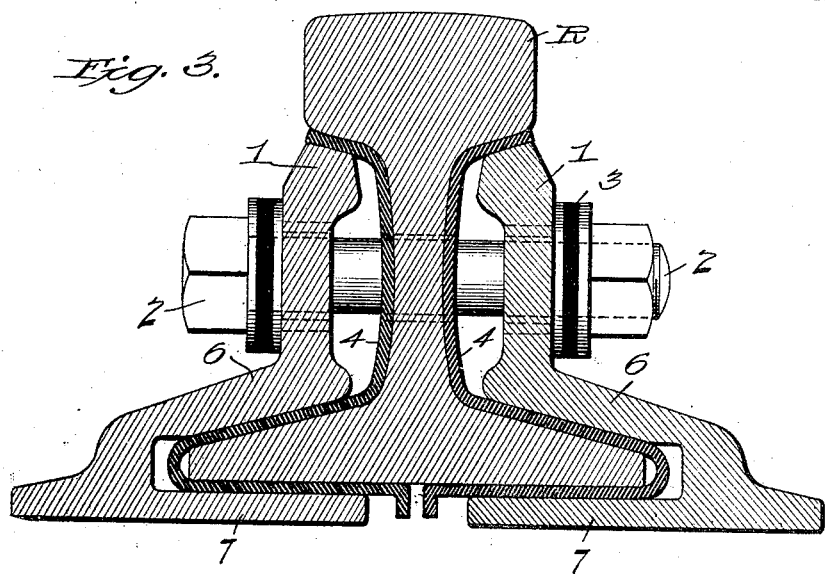
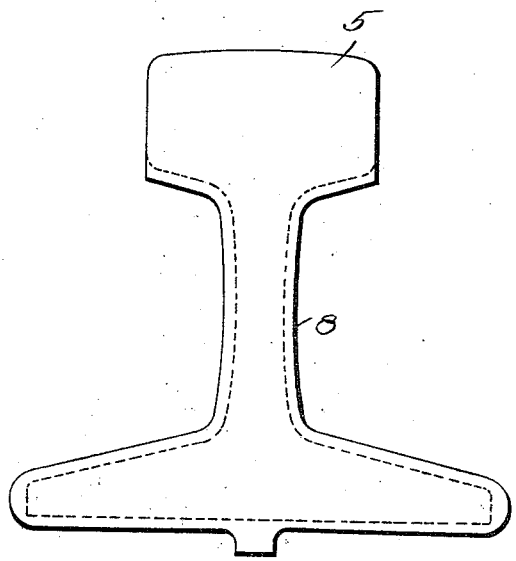
Inventors
Bancroft G. Braine
and Victor C. Armstrong B. G. BRAINE & V. C. ARMSTRONG.
INSULATED RAIL JOINT.
APPLICATION FILED APR. 16, 1908.
1,066,074.
Patented July 1, 1913.
4 SHEETS—SHEET 3.
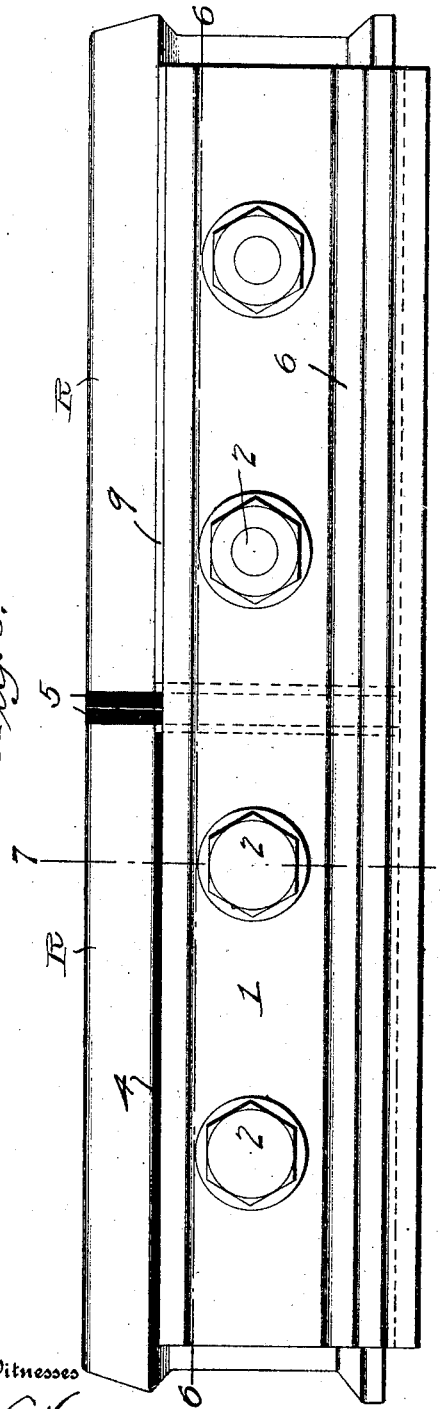
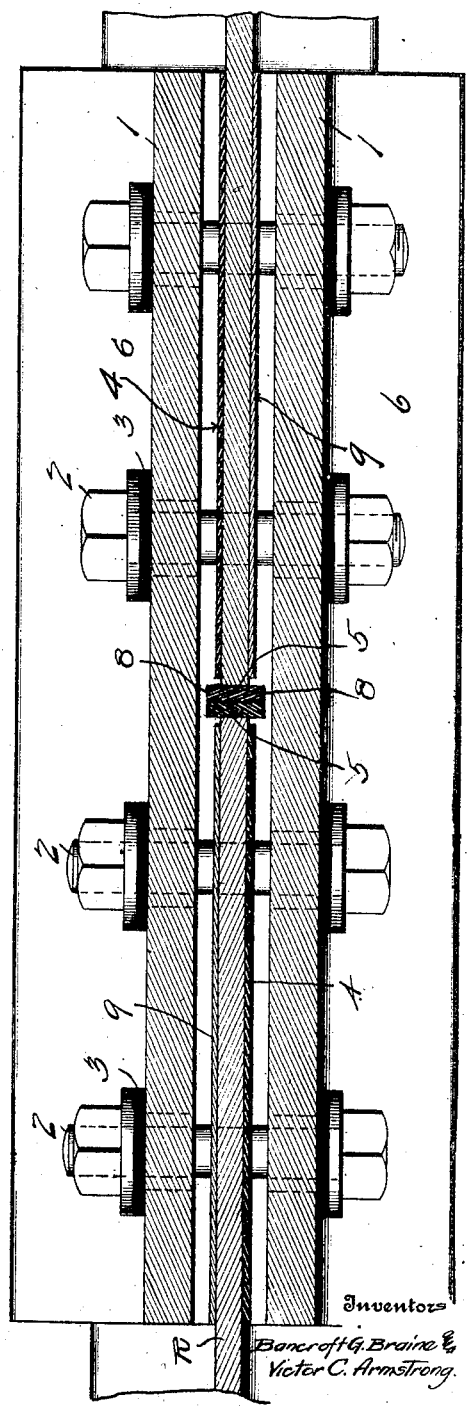

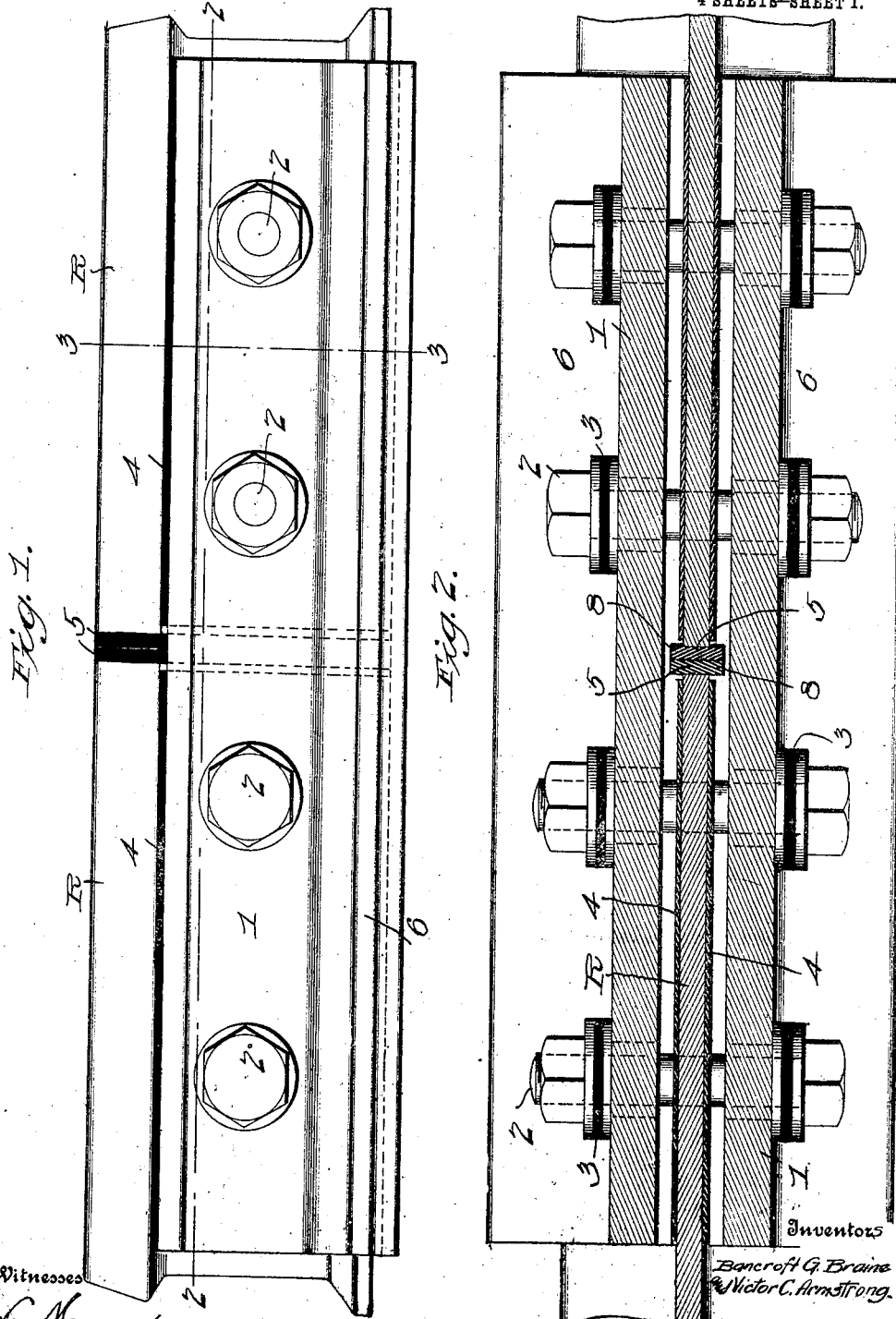

B. G. BRAINE & V. C. ARMSTRONG.
INSULATED RAIL JOINT.
APPLICATION FILED APR. 16, 1908.
1,066,074.
Patented July 1, 1913.
4 SHEETS—SHEET 4.
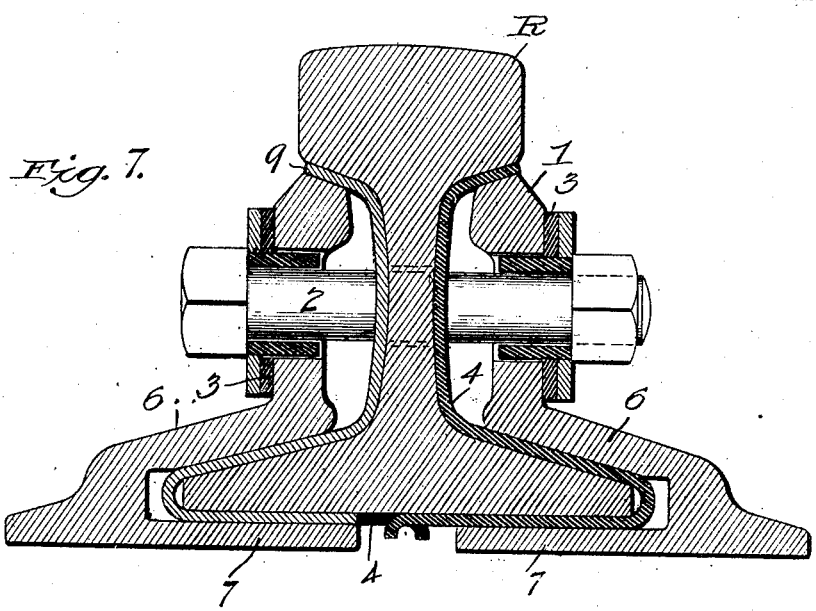
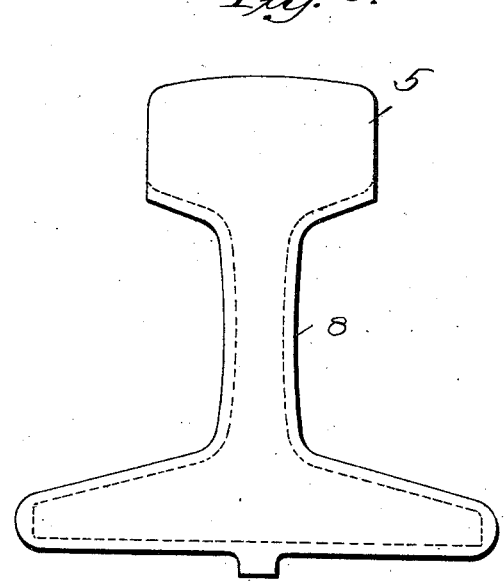
Witnesses
G. L. Macrane
R. C. Braddock.
Inventors
Bancroft G. Braine
and Victor C. Armstrong
By
S. P. Wolhaupter
Attorney

UNITED STATES PATENT OFFICE.

BANCROFT G. BRAINE AND VICTOR C. ARMSTRONG, OF NEW YORK, N. Y., ASSIGNORS TO THE RAIL JOINT COMPANY, OF NEW YORK, N. Y., A CORPORATION OF NEW YORK.

INSULATED RAIL-JOINT.

1,066,074.  Specification of Letters Patent.  Patented July 1, 1913.

Application filed April 16, 1908. Serial No. 427,462.

*To all whom it may concern:*

Be it known that we, BANCROFT G. BRAINE and VICTOR C. ARMSTRONG, citizens of the United States, both residing at New York city, in the county of New York and State of New York, have invented certain new and useful Improvements in Insulated Rail-Joints, of which the following is a specification.

This invention relates to the subject of insulated rail joints, and has special reference to certain novel and practical improvements in the insulation for joints of that character.

To this end the invention contemplates an effective arrangement and use of the insulating material for rail joints, along thoroughly practical lines, so as to insure greater facility in the application of the insulating material, while also securing a maximum economy in service.

Furthermore, the invention provides for the complete insulation of a rail joint without affecting the strength of the insulation or lessening the effective insulating area thereof.

With these and other practical objects in view, which will readily appear to those familiar with the art as the nature of the invention is better understood, the same consists in the novel form and arrangement of the insulation hereinafter more fully described, illustrated and claimed.

The essential features of the invention are necessarily susceptible to structural modification, and to application to various kinds of joints, without departing from the scope thereof, but certain preferred embodiments of the invention are exemplified by the accompanying drawings, in which:

Figure 1 is a side elevation of an insulated rail joint, of the continuous type, showing such joint insulated according to the present invention. Fig. 2 is a horizontal sectional view on the line 2—2 of Fig. 1. Fig. 3 is a vertical cross sectional view on the line 3—3 of Fig. 1. Fig. 4 is a plan view or elevation of the design of insulating end post preferably employed in carrying out the invention. Fig. 5 is a view similar to Fig. 1 showing a joint of the continuous type provided with cross insulation employed in accordance with the present invention. Fig. 6 is a horizontal longitudinal sectional view on the line 6—6 of Fig. 5. Fig. 7 is a vertical cross sectional view on the line 7—7 of Fig. 5. Fig. 8 is a plan view or elevation of the design of insulating end post utilized in the structure shown in Figs. 5, 6, and 7.

Like references designate corresponding parts in the several figures of the drawings.

A distinctive feature of the present invention resides in combining with a rail joint having continuous joint bars or splice bars, separate insulation plates for each rail, and which insulation plates may therefore be characterized as discontinuous plates in contradistinction to the said continuous joint bars or splices. This desirable combination may be embodied in any or all varieties of rail joints employing fish plates, angle bars, channel bars, or any of the divers forms of splices which extend across the joint between the meeting ends of the rails and are fastened to the latter by the usual joint bolts, but inasmuch as the improved insulation provides a most satisfactory and practical insulated joint of the well known continuous type, the latter is shown in the various figures of the drawings for the purpose of exemplifying the improvements. Hence, referring to these drawings, attention is first directed to the illustration of Figs. 1, 2, 3, and 4. In the figures of the drawings indicated, the rail joint shown essentially comprises in its general organization the service rails R, the opposite joint bars 1—1, of the continuous type, the usual joint bolts 2, the bolt insulation 3, the side insulation sheets 4, and the insulating end post 5. The said side joint bars are of the conventional design, each of the same consisting of an angle bar member 6 and a horizontal, inwardly extending rail supporting base section 7 integrated with the foot flange of the angle bar, all of which is well understood by those familiar with the art. Also, no change is required by the present invention in the bolt insulation 3, as any of the ordinary bolt insulating expedients may be resorted to in order to provide an effective insulation between the bolts and the joint bars, but the distinguishing improvement of the present invention resides in having the insulation plates 4 discontinuous, that is, in separate pieces for each rail.

The insulation plates consist of the usual fiber sheets or other suitable insulating material, and in their application to a rail joint of the character shown in the several figures of the drawings the said insulation plates are interposed between the rails and the side joint bars 1, and follow the general contour of such bars so as to extend continuously from points beneath the rail heads, about the rail sides, and over and under the rail flanges, as plainly shown for instance in Fig. 3 of the drawings, thus affording complete and effective insulation for all bearing points and faces of the joint bars 1.

Irrespective of the contour of the insulation plates 4, the latter, being cut in separate pieces for each rail, do not cross the joint between the meeting ends of the rails, and according to the form of the invention shown in Figs. 1, 2, and 3 of the drawings, each rail has the separate insulation plates 4 therefor arranged upon both sides thereof so that in the complete joint there are four separate and independent pieces or sections of the insulation plates 4, two for each rail. In addition to the insulation plates 4 being discontinuous, another feature of the invention consists in having said plates a trifle shorter than one-half the length of the rail joint, and in making the fiber or equivalent insulating end post 5 not only in the form of the cross section of the rail with a head member of normal width and height, but also of an extra width at the under sides of and below said head member so as to provide such post with what may be termed overlap edges 8 which overlap and project to the full width of the adjacent end edges of the insulation plates 4 next to the meeting ends of the rails, as may be clearly seen in Figs. 1 and 2 and 6 of the drawings.

The distinct advantage of the construction just described is that the end post made in the manner explained and shown is much stronger than the ordinary end post, and the separate discontinuous insulation plates 4 being short, can be much more readily applied. Furthermore, it will be obvious that the individual insulation plates 4 can be shifted from one side of the rail to the other, or from the end of one rail to the end of the other rail and thus interchanged or shifted about to such advantage as the condition of the joint may require. In this connection, it will be quite apparent that in the case of repairs the capability of the insulation plates to be shifted or interchanged would be quite advantageous and effect a considerable saving in material, particularly on account of the manner in which the cutting out of the insulation starts at the ends of the rail. Furthermore, in case the spacing of the bolt holes was incorrect, or if the user of the joint desires to cut additional holes in the fiber or insulation plate, it would be a comparatively easy matter to transpose such plate so as to have the portion that was originally at the end of the joint, come at the end of the rail, thereby getting additional wear out of the fiber.

Various arrangements of the separate insulation plates may be resorted to, such for instance as the one suggested in the group of Figs. 5, 6 and 7. In these figures of the drawings the joint is shown as having the insulation plates alternated with steel filler plates 9, which latter conform in size, contour, and arrangement to their complemental insulation plates. In other words, as clearly indicated in Fig. 6, each rail has upon one side the insulation plate, and upon its opposite side a steel filler plate 9, the said elements being reversed in position on the other rail, thereby making a cross insulation for the joint.

From the foregoing, it is thought that the construction and advantages of the herein described improvement in rail joint insulation will be apparent without further description, and it will be understood that changes in the form, proportion, and minor details of construction may be resorted to without departing from the spirit or sacrificing any of the advantages of the invention.

We claim:

An insulating means for rail joints, comprising in combination with rails and side joint bars having rail supporting base sections, a plurality of insulation plates and filler plates lying between the rails and the various rail bearing faces of the joint bars and arranged in complemental relation, each of said plates being in a separate piece that is shorter than one half the length of the rail joint and terminating at one end at a point short of the meeting ends of the two rails, and an insulating end post in the form of the cross section of the rails, said end post having a head member of normal width and height and being of an extra width at the under sides of said head member and at all points below the same to form overlapping edges which are arranged to overlap the end edges of the said various plates next to the meeting ends of the rails.

In testimony whereof we hereunto affix our signatures in the presence of two witnesses.

BANCROFT G. BRAINE.
VICTOR C. ARMSTRONG.

Witnesses:
BENJ. WOLHAUPTER,
L. SCHERMERHORN.

---

Copies of this patent may be obtained for five cents each, by addressing the "Commissioner of Patents, Washington, D. C."